US012724891B2

(12) United States Patent
Ezrielev et al.

(10) Patent No.: US 12,724,891 B2
(45) **Date of Patent: *Sep. 1, 2026**

(54) CYBER RECOVERY FORENSICS KIT CONFIGURED TO SEND RETURN MALWARE

(71) Applicant: Dell Products L.P., Round Rock, TX (US)

(72) Inventors: Ofir Ezrielev, Be'er Sheba (IL); Jehuda Shemer, Kfar Saba (IL); Amihai Savir, Newton, MA (US)

(73) Assignee: Dell Products L.P., Round Rock, TX (US)

(*) Notice: Subject to any disclaimer, the term of this patent is extended or adjusted under 35 U.S.C. 154(b) by 393 days.

This patent is subject to a terminal disclaimer.

(21) Appl. No.: 17/937,882

(22) Filed: Oct. 4, 2022

(65) Prior Publication Data

US 2024/0111865 A1 Apr. 4, 2024

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC ......................... G06F 21/566; G06F 2221/034
See application file for complete search history.

(56) References Cited

U.S. PATENT DOCUMENTS 5,398,196 A * 3/1995 Chambers ............ G06F 21/566 714/28
9,009,829 B2 * 4/2015 Stolfo .................. G06F 21/552 726/23
9,740,862 B1 8/2017 Quinlan et al.
10,169,585 B1 1/2019 Pilipenko et al.
10,878,084 B1 12/2020 Voss et al.
10,885,191 B1 * 1/2021 Gupta ................ G06F 9/45558
11,032,319 B1 * 6/2021 Roundy .................. G06F 21/62
2010/0077483 A1 * 3/2010 Stolfo .................. G06F 21/554 726/23
2016/0080414 A1 * 3/2016 Kolton ................ H04L 63/1491 726/23
2016/0132351 A1 * 5/2016 Kashyap ................ G06F 21/52 718/1
2016/0292419 A1 10/2016 Langton et al.
2017/0118241 A1 * 4/2017 Call ..................... H04L 67/535
2017/0134405 A1 * 5/2017 Ahmadzadeh ........ G06F 21/554
(Continued)

FOREIGN PATENT DOCUMENTS

WO 2018/038718 A1 3/2018

OTHER PUBLICATIONS

Cybersecurity: Past, Present, and Future (Year: 2022).
(Continued)

*Primary Examiner* — Carl G Colin
*Assistant Examiner* — Zhe Liu
(74) *Attorney, Agent, or Firm* — Workman Nydegger

(57) ABSTRACT

Data protection including malware response operations are disclosed. When a production system is attacked, the malware is allowed to run in a forensic environment in order to learn its operational characteristics. Once learned, a return malware can be placed in the data. The return malware is transmitted to a malware host system by the malware itself and executed.

19 Claims, 6 Drawing Sheets

(56) References Cited

U.S. PATENT DOCUMENTS

2017/0237771 A1* 8/2017 Miroshnikov ...... H04L 63/1466 726/23
2018/0114020 A1* 4/2018 Hirschberg ........... G06F 21/566
2018/0165451 A1* 6/2018 Kawakita ............ G06F 9/45558
2018/0167403 A1 6/2018 Smith
2020/0204589 A1* 6/2020 Strogov .............. H04L 63/1416
2020/0210575 A1 7/2020 Huang et al.
2021/0067553 A1* 3/2021 Ries .................... H04L 63/0263
2021/0124826 A1 4/2021 Matsuda et al.
2021/0157913 A1 5/2021 Fralick et al.
2021/0176257 A1 6/2021 Yavo et al.
2021/0209225 A1 7/2021 Ghosh et al.
2021/0243226 A1* 8/2021 El Gamal ........... H04L 63/1491
2021/0336970 A1* 10/2021 Woo .................... G06F 11/1446
2021/0349748 A1 11/2021 Dunfey et al.
2021/0365556 A1 11/2021 Summerlin et al.
2022/0100855 A1 3/2022 Kumar et al.
2022/0398315 A1* 12/2022 Young ................... G06F 21/552
2023/0009355 A1 1/2023 Challener
2023/0239323 A1* 7/2023 Seletskiy ............ H04L 63/1491 726/23
2023/0254331 A1 8/2023 Wright
2023/0396646 A1 12/2023 Wang et al.
2024/0070034 A1 2/2024 Bell et al.
2024/0086525 A1 3/2024 Orazio et al.
2024/0111866 A1 4/2024 Ezrielev et al.
2024/0111867 A1 4/2024 Ezrielev et al.
2024/0126879 A1 4/2024 Ezrielev et al.

OTHER PUBLICATIONS

IBM Security Solutions Architecture for Network, Server and Endpoint (Year: 2011).

Alhaidari et al. "ZeVigilante: Detecting Zero-Day Malware Using Machine Learning and Sandboxing Analysis Techniques" (Year: 2022).

* cited by examiner

CYBER RECOVERY FORENSICS KIT CONFIGURED TO SEND RETURN MALWARE

FIELD OF THE INVENTION

Embodiments of the present invention generally relate to a computing forensics system. More particularly, at least some embodiments of the invention relate to systems, hardware, software, computer-readable media, and methods for protecting data from cyber threats.

BACKGROUND

Most entities rely on computing systems. These computing systems include applications and their data. Hospitals, for example, have applications that require/use/generate data related to patients, medicines, procedures, and the like. Much of this data is confidential. Airlines rely on applications and data to manage flights, passengers, employees, and more.

These entities exert substantial efforts to ensure that their data is available when needed. These efforts include generating backups of the production systems/data. Generating backups helps ensure that in the event of data loss, the production systems can be restored, and operations can resume.

Data corruption or loss, however, can occur in different ways. The loss of a disk drive due to hardware failure, for example, can be quickly resolved. The loss of data (e.g., inability to access the data) due to malware or other cyber threats can be much more problematic.

Malware that infects a production system, for instance, can cause severe problems in the entity's operations. In addition to infecting production systems, malware may also infect backups. Recovering from malware can be complicated and difficult. Further, the delay associated with recovering the production system may be further delayed when law enforcement or insurance companies are involved.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection systems and data protection operations. More particularly, at least some embodiments of the invention relate to systems, hardware, software, computer-readable media, and methods for responding to malware and other cyber-attacks.

In general, example embodiments of the invention relate to data protection operations including, but not limited to, data protection operations, backup operations, snapshot operations, restore/recover operations, point-in-time backup/recover operations, malware response operations, malware evaluation operations, or the like or combinations thereof.

The term malware as used herein and by way of example, may refer to ransomware, viruses, rootkits, spyware, adware, trojans, worms, phishing attacks, or other unwanted software or cyber-attacks.

Embodiments of the invention relate to a forensic engine, or a forensics kit configured to evaluate and/or respond to malware. When malware is detected in a production system (or in a backup), the forensic engine may perform a snapshot or other backup of the production system. The snapshot, which includes the malware, is an infected snapshot and may be deployed to a forensics environment such that the forensic engine can learn how the malware operates. The forensic engine allows the malware to operate in an observed manner such that operational characteristics of the malware can be learned. This may include determining how files are altered (e.g., deleted, changed, encrypted), how and where data is sent by the malware, how the malware spreads, how the malware response to anti-malware software, how the malware tries to avoid detection, how the malware infects backups, and the like.

Embodiments of the invention allow the forensic engine to learn these operational characteristics or other behavior. While learning the operational characteristics or after learning the operational characteristics, the forensic engine may be configured to operate in a proactive manner. For example, the forensic engine can trick or cause the malware to send a response malware back to the malware's source. The forensic engine may also emulate communications of the malware. The response malware may be able to mitigate, or reverse damage caused by the malware in the production system.

Figure 1:
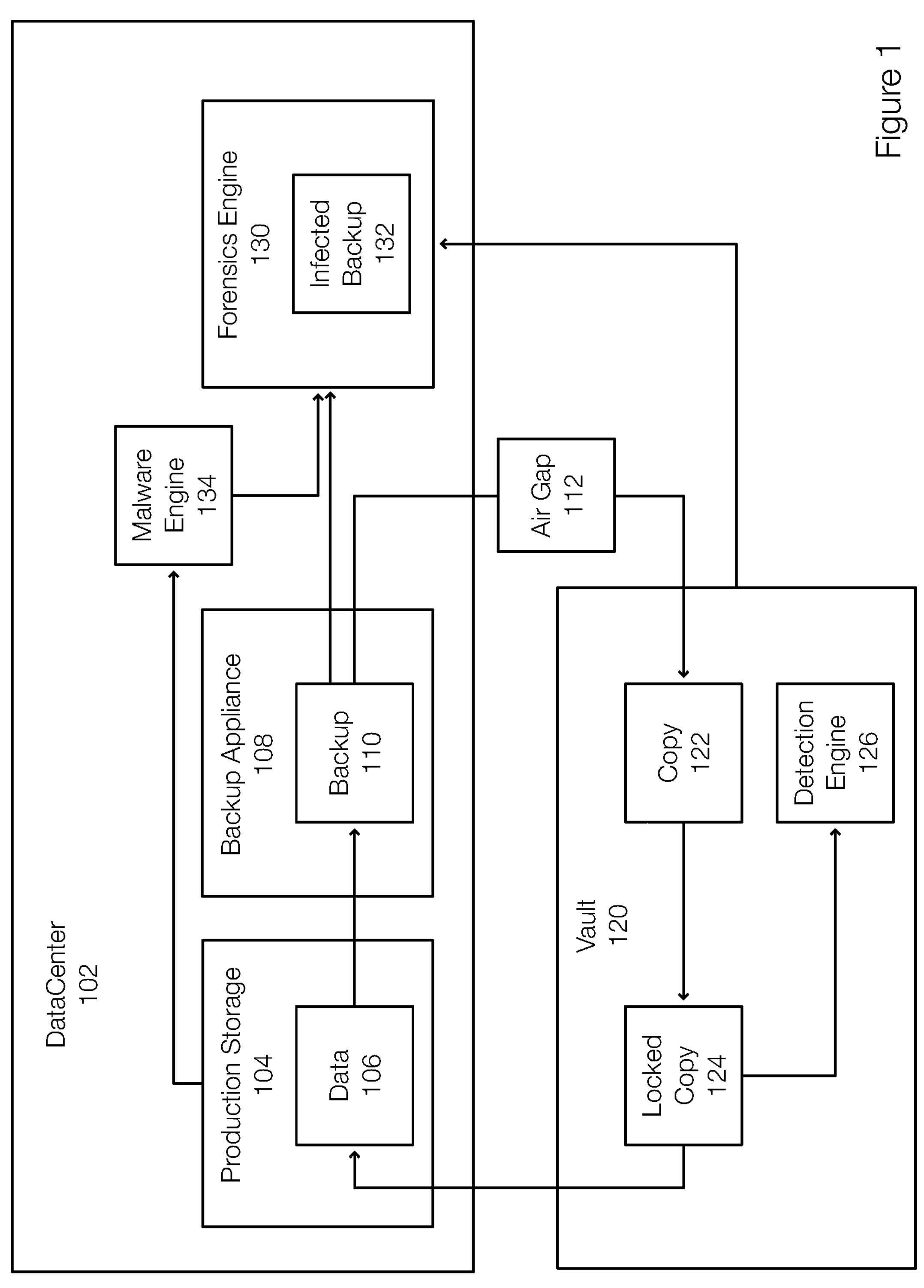
FIG. 1 discloses aspects of a forensic engine or kit configured to perform data protection operations including learning operations performed by a malware and responding to the malware.

FIG. 1 discloses aspects of a forensic engine configured to perform data protection operations including malware related operations. FIG. 1 illustrates a datacenter 102 that includes production storage 104, which stores production data 106. The datacenter 102 may also host applications associated with the data 106. The production data 106 may include data required or accessed by users, applications, or the like. The data 106 may include files, objects, blocks, a database, emails, images, videos, documents, spreadsheets, presentations, or the like or combination thereof.

Although FIG. 1 illustrates production storage 104 of a datacenter 102, the production storage 104 may be an on-premise storage system, an edge system storage, or the like or combination thereof. The production storage 104 may include storage devices such as hard disk drives.

A backup appliance 108 is configured to generate and store backups of the data 106 (and/or applications), represented as the backup 110. The backup 110 may be a full backup, a synthetic backup, incremental backups, snapshots, or the like. The backup appliance 108 may be a virtual appliance or a physical appliance.

More generally, the backup appliance 108 may protect data, applications, or the like. The backup appliance 108 may transmit the backup 110 to a vault 120, which may be protected by an air gap 112 controlled by the vault 120. This allows a copy 122 of the data 106 to be stored in the vault 120 only when a connection is available (e.g., the air gap 112 is configured to allow communications). After ingestion into the vault 120, the copy 122 is locked to generate a locked copy 124. The locked copy 124 is immutable in one example. The vault 120 may be created in the datacenter 102 or in another location that is remote from the data 106 and/or the backup appliance 108.

During a recovery operation, the data 106 may be recovered from the locked copy 124 (or other backup in the vault 120). In some examples, the data 106 may be recovered from the copy 122 if necessary. In one example, the backup 110 may be a namespace that is backed up to a namespace in the vault 120. The backup 110 may be transmitted to a namespace in the vault 120 as the copy 122. Next, the copy 122 may be copied to another namespace and retention locked, which results in the locked copy 124.

The air gap 112 may not be required but provides a more secure backup environment. Once the locked copy 124 is generated and retention locked, the immutability is guaranteed in one example. For example, the locked copy 124 is secure from attack vectors that adversely impact backups because the vault 120 may not be accessible, due to the air gap 112, which is controlled from inside the vault 120 in one example.

In one example, the vault 120 may be a target site configured to store backups received from the backup appliance 108. The vault 120 may be associated with a corresponding appliance that may be configured to store the backups in the target site and also perform restore or recover operations. In one example, the air gap 112 is not present and the value 120 may simply represent backup storage that stores backups received from the backup appliance 108.

The production storage 104 (or more generally the production system) may be associated with a malware engine 134. When the malware engine 134 detects malware in the production storage 104 or in the production system, the malware engine 134 may trigger the forensic engine 130. The forensic engine 130 may be triggered in another manner or may include the malware engine 134.

When triggered, the forensic engine 130 may generate a snapshot (e.g., a point-in-time snapshot) or backup of the production system, which is illustrated as an infected backup 132. The infected backup 132 may be taken from the data 106, may be a PiT copy generated from the backup 110, or the like. In this example, the infected backup 132 may represent different types of backups.

Figure 2:
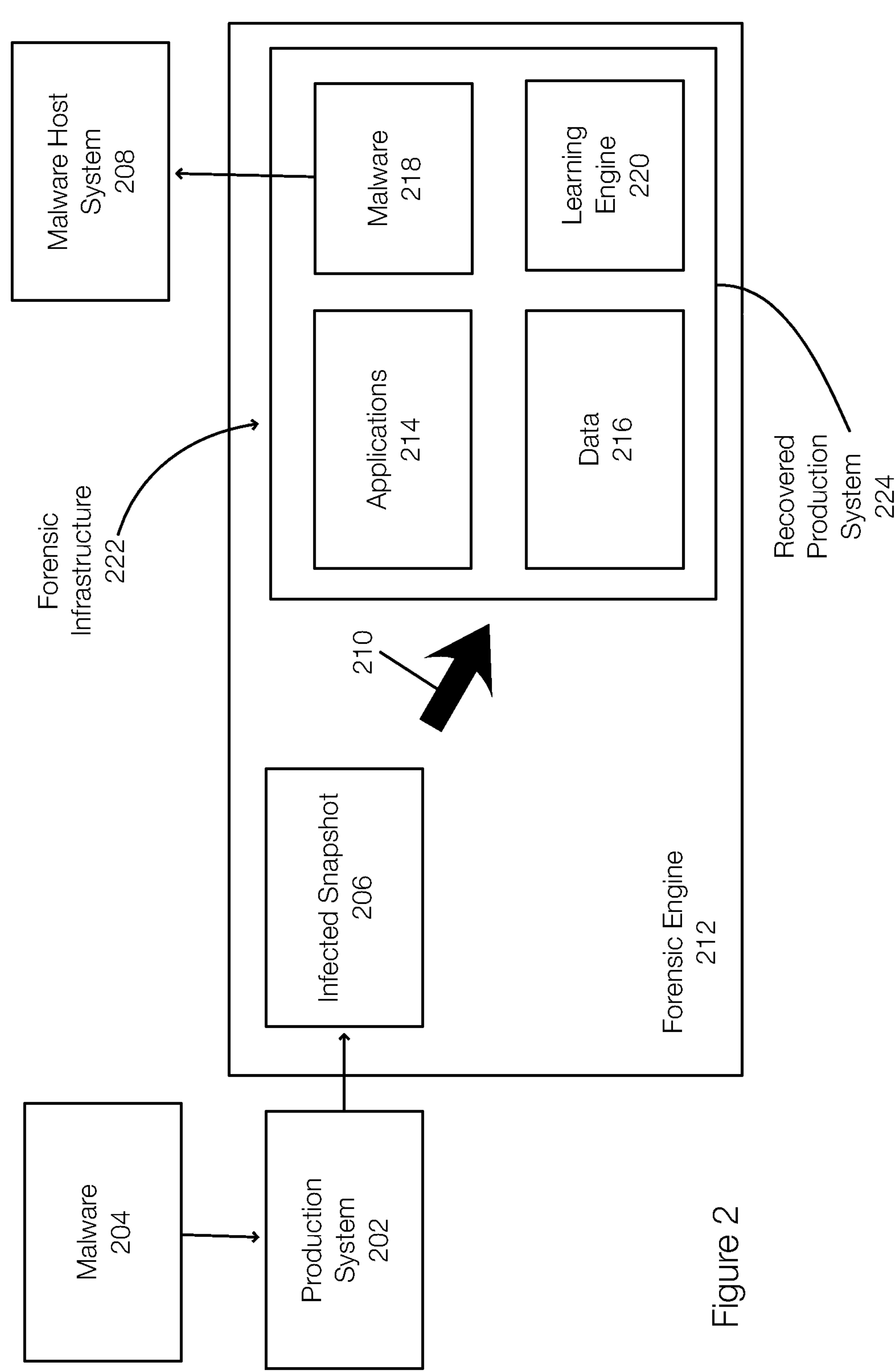
FIG. 2 discloses aspects of a forensic engine configured to perform data operations including malware response operations.

FIG. 2 discloses aspects of performing malware related operations. In FIG. 2, malware 204 has infected a production system 202. This triggers a snapshot or backup operation by the forensic engine 212 (or the backup appliance), which generates an infected snapshot 206. The forensic engine 212 may deploy 210 the infected snapshot 206 to a forensic infrastructure 222. The forensic infrastructure 222 may be configured to appear as a real system. This allows the infected snapshot 206 to operate as if it were a production system.

Thus, the infected snapshot 206 may be recovered as the recovered production system 224. The malware 204 is represented as the malware 218 in the recovered production system 224. Thus, the recovered production system 224, which is infected with the malware 218, is recovered to the forensic infrastructure 222 and includes applications 214, data 216, and a learning engine 220. The learning engine 220 may be added by the forensic engine 212 or is part of the forensic engine 212. More specifically, the learning engine 220 may be deployed to the recovered production system 224 in the forensic infrastructure 222.

The learning engine 220 is configured to learn the operational characteristics of the malware 218. This may include monitoring and observing the operation of the malware 218. This allows the learning engine 220 to determine what files in the data 216 are accessed by the malware 218, learn when the files are accessed, learn functions performed by the malware 218, monitor communications with a malware host system 208, and the like. The learning engine 220 may learn how often the malware 218 acts, how the malware 218 replicates or spreads, and the like. The learning engine 220 may log actions performed by the malware 218 or the like. The insights learned by the learning engine 220 are collectively referred to as the operational characteristics of the malware 218.

The output (e.g., the operational characteristics) of the learning engine 224 may be analyzed by the forensic engine 212. This allows the forensic engine 212 to perform both reactive and proactive actions. For example, the forensic engine 212 may be able to react more quickly in the event that the malware 218 reoccurs. The forensic engine 212 may be able to prevent future infections of the malware 218.

In one example, the infected snapshot 206 may be recovered to an infrastructure 222 where the data 216 is fake or dummy data. Thus, the real data may be replaced with fake data that appears real. The data 216 may be prepared in advance. In the event that the forensic infrastructure 222 operates in a live manner, any data exported by the malware 218 is benign and non-damaging to the production system 202.

Figure 3:
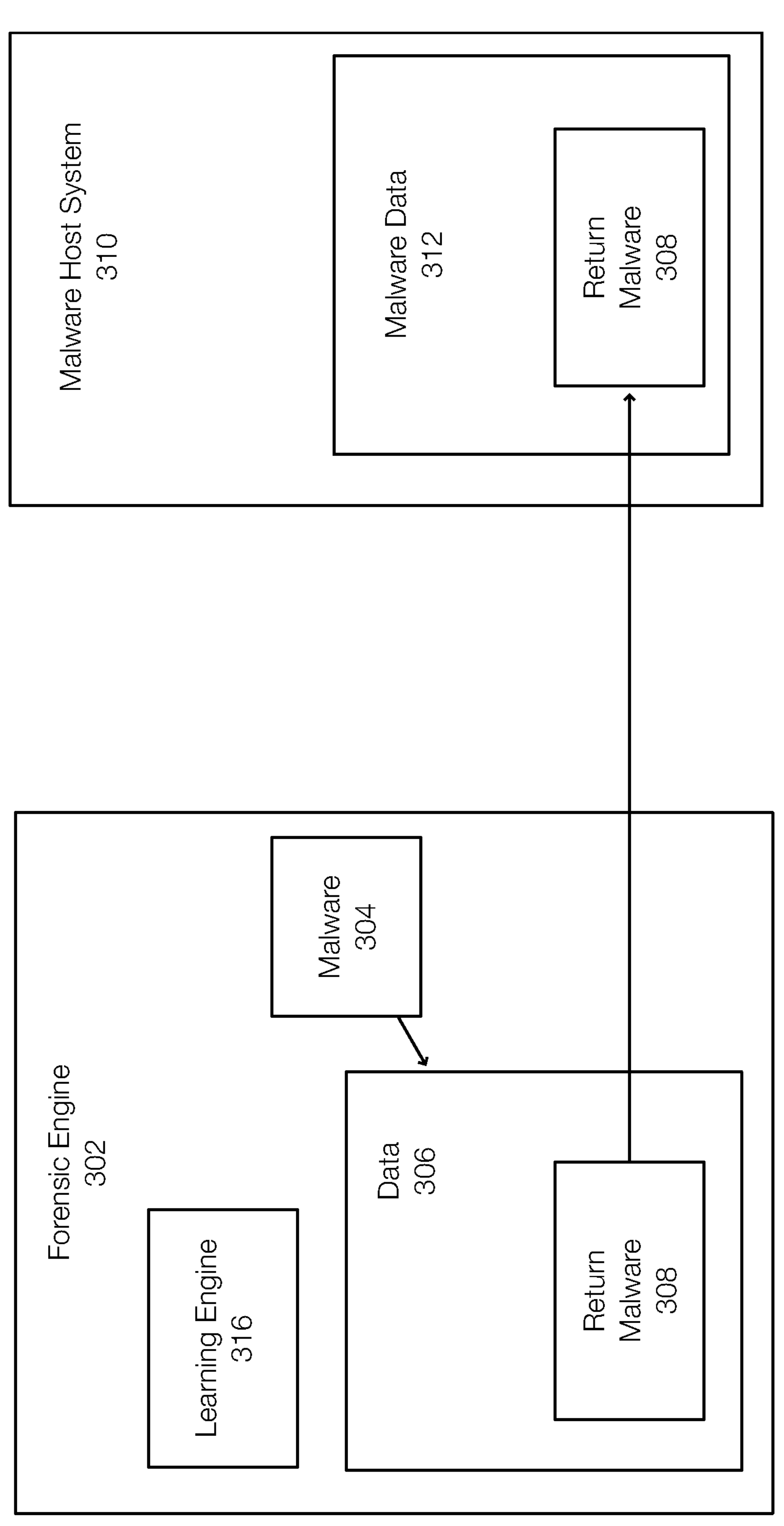
FIG. 3 discloses aspects of a forensics operation configured to perform a malware response operations.

FIG. 3 illustrates an example of a malware response operation. In FIG. 3, forensic engine 302 may be operating a recovered production system that has been recovered from an infected backup. FIG. 3 illustrates the data 306 (or more generally the recovered production system), which is infected or attacked by the malware 304. In this example, the learning engine 316 has learned the operational characteristics of the malware 304 and the forensic engine 302 (or the learning engine 316) altered the data 306 to include return malware 308.

Based on the operational characteristics, the return malware 308 is placed such that the malware 304 operates to transmit the return malware 308 back to a malware host system 310. Thus, even if the malware 304 is transmitting some of the data 306, which may be fake, the malware 304 is also tricked or caused to transmit the return malware 308 back to the malware host system 310.

The malware data 312 at the malware host system 310 may include data from the data 306. However, the forensic engine 302 has been able to place the return malware 308 at the malware host system 310 such that the malware data 312 is infected. More specifically, the malware 304 also transmits the return malware 308 to the malware host system 310, which then runs as return malware 308 on the malware host system 310. The return malware 308 may the same or different from the malware 304.

The return malware 308 may be configured to search the malware system 310 for information or data (e.g., cryptographic keys) that may allow encrypted data to be decrypted.

The return malware 308 may act on the malware system 310, for example, by encrypting the malware system 310. The return malware 308 may interfere with other instances of the malware 304 instantiated in other systems. The return malware 308 may attempt to collect information from the malware system 310 to learn who operates the malware system 310, how the malware system operates 310, to identify partners or participants in the distribution of the malware 304, or the like. This may be enabled as a law enforcement tool in responding to malware attacks. The return malware 308 may not cause any actual damage to the malware host system 310 but may be configured to simply learn information that may aid in preventing/removing/healing current and/or future attacks and/or information that may be valuable to law enforcement or other investigators.

Figure 4:
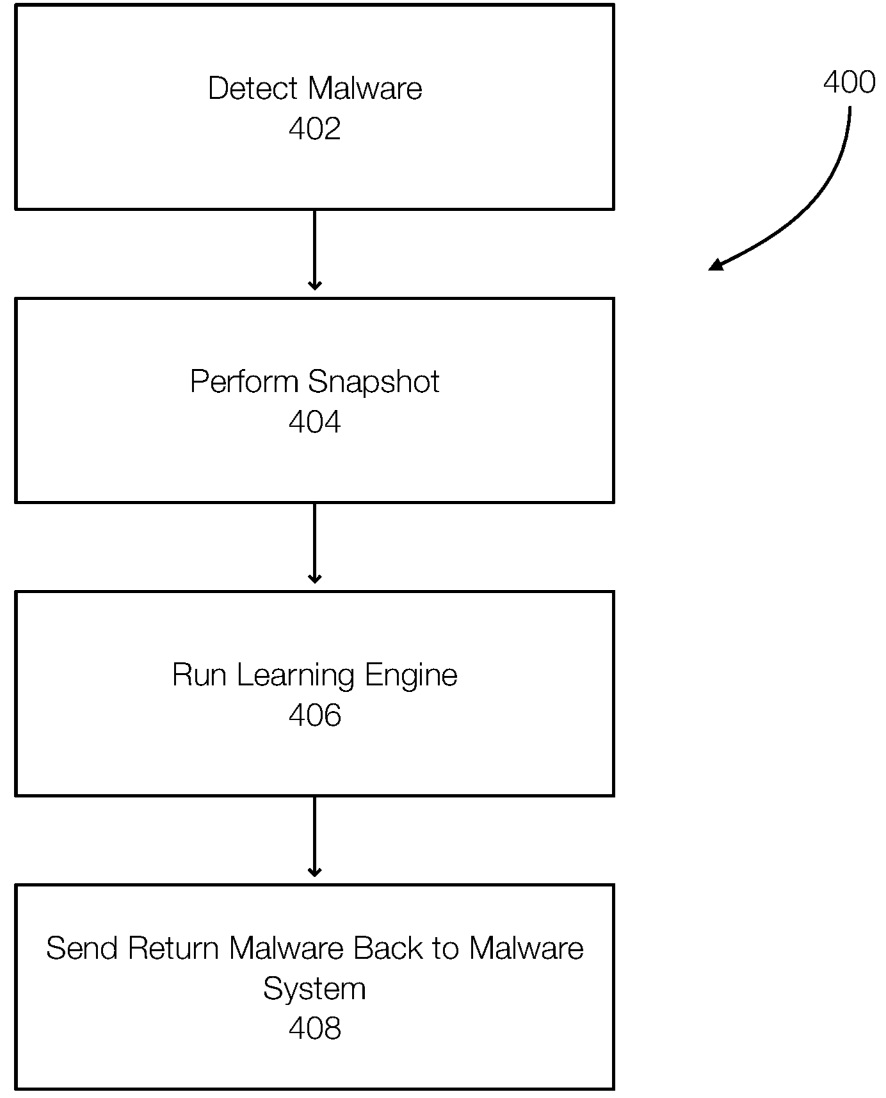
FIG. 4 discloses aspects of a malware response operation.

FIG. 4 discloses aspects of performing malware related operations. In the method 400, malware may be detected 402 in a production system or in a backup. After the malware is detected, a snapshot (or other backup) is performed 404 and delivered to a forensic engine. The forensic engine may generate the snapshot of the production system or generate a copy of an infected backup.

Once the snapshot, which is infected, is taken (or a copy of an infected backup), the snapshot is recovered to a forensic infrastructure allowed to execute in a forensic infrastructure as if it were a production system. In some examples, the forensic infrastructure may be a sandbox environment. A learning engine is deployed and runs 406 to learn operational characteristics of the malware. This may include how the malware communicates, reads data, encrypts data, copies data, moves data, infects operating systems, monitors communications, replicates, hides, or the like. Running the learning engine, after the operational characteristics are learned, includes planting return malware in the data of the recovered production system. In one example, the return malware may be prepared in advance and already exist in the data of the recovered production system.

In one example, the sandbox environment may be configured to emulate communications of the malware. Thus, if the operation of the malware depends on communication with a malware host (e.g., heartbeat or other communication), the forensic engine may be configured to emulate this type of communication.

Because the learning engine understands the operational characteristics of the malware, the learning engine is able to plant the return malware in a manner that, in effect, tricks the malware into sending the return malware back to the malware host system. Thus, the learning engine, in effect, sends 408 the return malware back to the malware host system. The return malware is then executed on the malware system. The functions performed by the return malware depend on how the return malware is configured.

Figure 5:
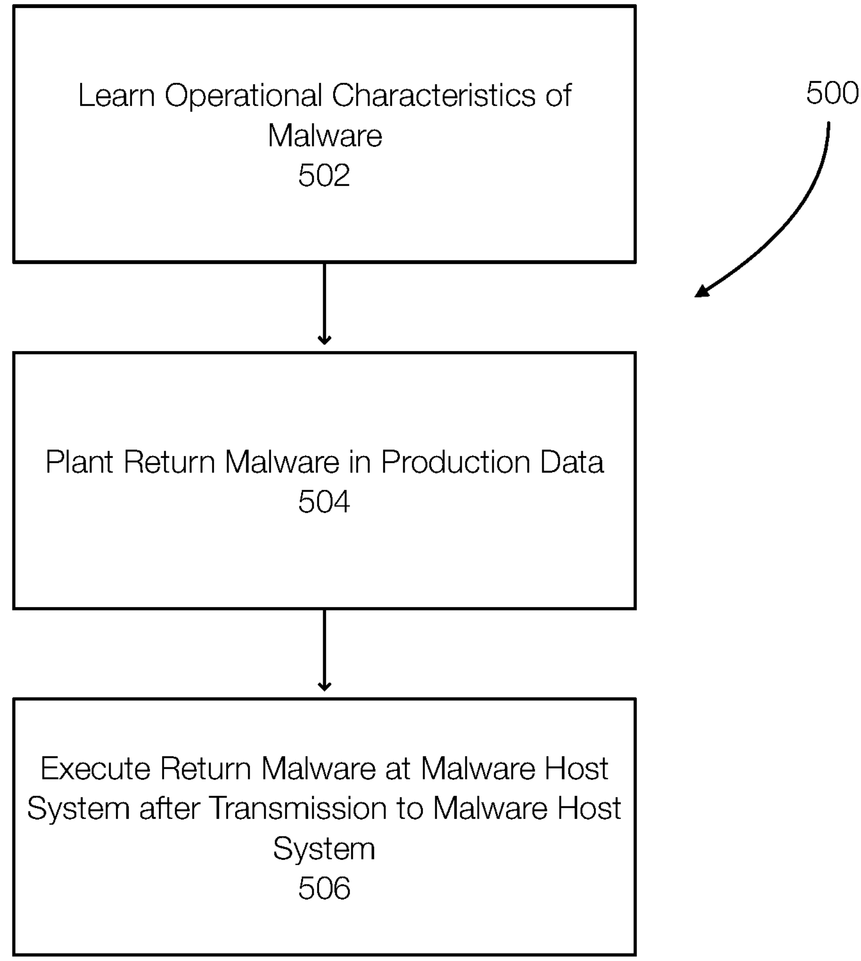
FIG. 5 discloses additional aspects of malware response operations.

FIG. 5 discloses aspects of malware response operations. In the method 500, operational characteristics of malware may be learned 502, for example, by operating infected systems in a forensic infrastructure. More specifically, the forensic engine may be configured to learn the operational characteristics of multiple malware. This may provide insight that may apply generally to known and unknown malware.

The operational characteristics may allow the forensic engine to plant 504 return malware in a production system that has not yet been attacked. In another example, this may allow the forensic engine to cause the malware to transmit the return malware back to the malware host. In the event of an attack, for example for attacks that are undetected, the previously planted return malware may be returned 506 to the malware host system and executed even if the specific operational characteristics of the malware may not be known. The operational characteristics learned from multiple malware improves the likelihood that the malware will transmit the return malware to the malware host system.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, malware detection operations, malware response operations, malware deployment operations, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the PowerProtect Cyber Recovery and associated data protection software, and storage environments such as the Dell-EMC DataDomain or PowerProtect storage environments. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: detecting malware in a production system, performing a backup of the production system by a forensic engine, recovering the backup to a forensic infrastructure as a recovered system, while operating the recovered system, learning operational characteristics of the malware, placing return malware into the recovered system or the production system based on the operational characteristics, wherein the return malware is configured to be returned to a malware host system by the malware, and executing the return malware in the malware host system.

Embodiment 2. The method of embodiment 1, wherein the malware views the return malware as data of the recovered system or of the production system and/or wherein the forensic engine is configured to emulate communications of the malware to a malware host system.

Embodiment 3. The method of embodiment 1 and/or 2, wherein the operational characteristics include functions performed by the malware, timing of the functions, communications performed by the malware, data affected by the malware, evasion functions, or combination thereof.

Embodiment 4. The method of embodiment 1, 2, and/or 3, further comprising configuring the return malware such that the malware transmits the return malware back to the malware host system.

Embodiment 5. The method of embodiment 1, 2, 3, and/or 4, wherein the return malware operates differently from the malware.

Embodiment 6. The method of embodiment 1, 2, 3, 4, and/or 5, wherein the return malware is configured to mitigate or reverse damage caused by the malware.

Embodiment 7. The method of embodiment 1, 2, 3, 4, 5, and/or 6, further comprising replacing data in the recovered system with fake data and allowing the recovered system to operate in a live and connected manner.

Embodiment 8. The method of embodiment 1, 2, 3, 4, 5, 6, and/or 7, wherein the recovered system is configured to operate normally.

Embodiment 9. A method comprising: learning operational characteristics of multiple malware, placing a return malware in a production system based on the operational characteristics of the multiple malware to cause, in the event of an attack by malware, the malware to transmit the return malware to a malware host system, and executing the return malware at the malware host system Embodiment 10. The method of embodiment 9, wherein the return malware is transmitted prior to detecting the malware at the production system.

Embodiment 11. The method of embodiment 9 and/or 10, further comprising altering the return malware and or a manner in which the return malware is places as additional operational characteristics become available.

Embodiment 12. The method of embodiment 9, 10, and/or 11, further comprising detecting the malware and generating a snapshot of the malware, wherein the snapshot is recovered and run to learn the operational characteristics of the malware.

Embodiment 13. A method for performing any of the operations, methods, or processes, or any portion of any of these, or any combination thereof disclosed herein.

Embodiment 14. A non-transitory storage medium having stored therein instructions that are executable by one or more hardware processors to perform operations comprising the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
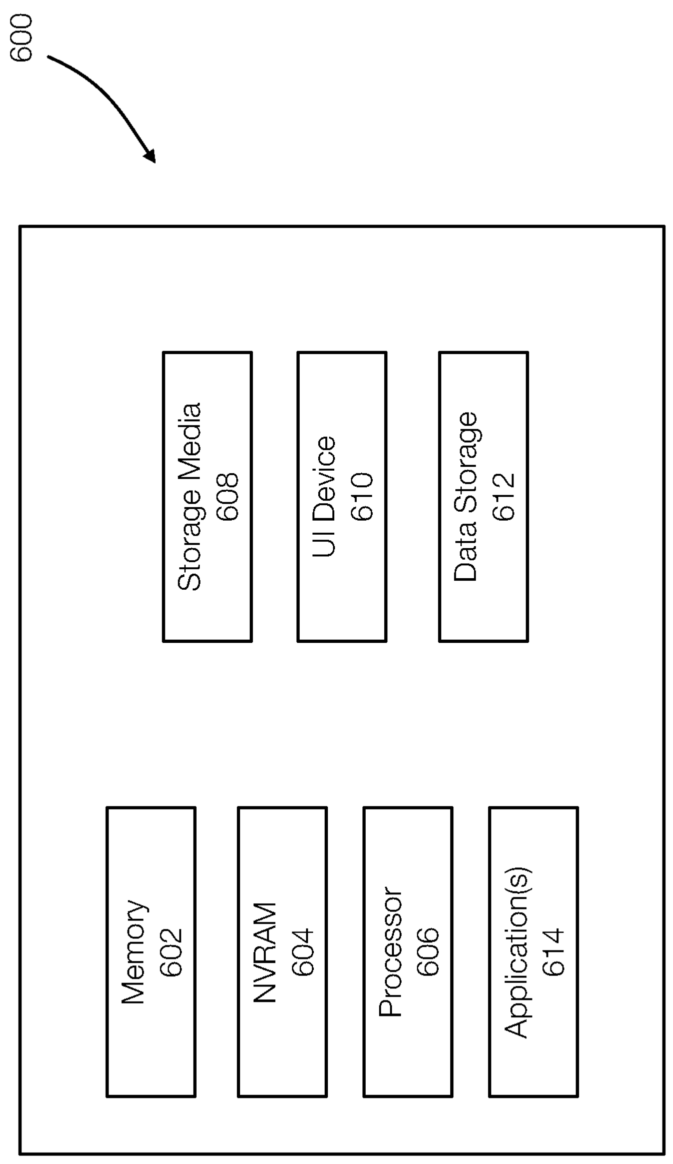
FIG. 6 discloses aspects of a computing device, system, or entity.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

detecting malware in a production system;

performing a backup of the production system by a forensic engine;

recovering the backup to a forensic infrastructure as a recovered system, wherein real data of the production system is replaced with dummy data that appears real to the malware, including matching structure, naming, file types, or metadata of the original production data in the recovered system;

operating the recovered system in a live manner that emulates normal production behaviors, including user interactions, scheduled tasks, or authentication activity, thereby deceiving the malware while the malware is operating the recovered system, wherein the malware executes unmodified in the recovered system and operates naturally without operator replacement or suppression, learning operational characteristics of the malware;

placing return malware into the recovered system or the production system responsive to the learned operational characteristics of the malware, including determining, while the malware operates on the recovered system containing the dummy data, whether the malware attempts to access, modify, or transmit the dummy data, and tailoring placement of the return malware based on an observed behavior of the malware, wherein the return malware is configured to be identified by the malware as data of the recovered system and transmitted to a malware host system by the malware; and executing the return malware in the malware host system, wherein the return malware, upon execution in the malware host system, is configured to covertly transmit a beacon or forensic telemetry indicating its execution and search the malware host system for cryptographic keys or other security credentials.

2. The method of claim 1, wherein the malware views the return malware as the data of the recovered system or of the production system and wherein the forensic engine is configured to emulate communications of the malware to the malware host system.

3. The method of claim 1, wherein the malware views the return malware as the data of the recovered system or of the production system and wherein the forensic engine is configured to emulate communications of the malware to the malware host system.

4. The method of claim 1, wherein the return malware operates differently from the malware.

5. The method of claim 1, wherein the return malware is configured to mitigate or reverse damage caused by the malware.

6. The method of claim 1, wherein the dummy data is prepared in advance, further comprising allowing the recovered system to operate in a live and connected manner on the dummy data.

7. The method of claim 6, wherein the recovered system is configured to operate like the production system.

8. A non-transitory storage medium having stored therein instructions that are executable by one or more hardware processors to perform operations comprising:

detecting malware in a production system;

performing a backup of the production system by a forensic engine;

recovering the backup to a forensic infrastructure as a recovered system, wherein real data of the production system is replaced with dummy data that appears realto the malware, including matching structure, naming, file types, or metadata of the original production data in the recovered system;

operating the recovered system in a live manner that emulates normal production behaviors, including user interactions, scheduled tasks, or authentication activity, thereby deceiving the malware while the malware is operating the recovered system to learn operational characteristics of the malware, wherein the malware executes unmodified in the recovered system and operates naturally without operator replacement or suppression;

placing return malware into the recovered system or the production system responsive to the learned operational characteristics of the malware, including determining, while the malware operates on the recovered system containing the dummy data, whether the malware attempts to access, modify, or transmit the dummy data, and tailoring placement of the return malware based on an observed behavior of the malware, wherein the return malware is configured to be identified by the malware as data of the recovered system and transmitted to a malware host system by the malware; and executing the return malware in the malware host system, wherein the return malware, upon execution in the malware host system, is configured to covertly transmit a beacon or forensic telemetry indicating its execution and search the malware host system for cryptographic keys or other security credentials.

9. The non-transitory storage medium of claim 8, wherein the malware views the return malware as data of the recovered system or of the production system.

10. The non-transitory storage medium of claim 8, wherein the operational characteristics include functions performed by the malware, timing of the functions, communications performed by the malware, data affected by the malware, evasion functions, or combination thereof.

11. The non-transitory storage medium of claim 8, wherein the forensic engine is configured to emulate communications of the malware to the malware host system.

12. The non-transitory storage medium of claim 8, wherein the return malware operates differently from the malware.

13. The non-transitory storage medium of claim 8, wherein the return malware is configured to mitigate or reverse damage caused by the malware.

14. The non-transitory storage medium of claim 8, further comprising allowing the recovered system to operate in a live and connected manner.

15. The non-transitory storage medium of claim 14, wherein the recovered system is configured to operate like the production system.

16. A method comprising:

learning operational characteristics of multiple malware by allowing each malware to operate unmodified in a corresponding recovered system within a forensic infrastructure, wherein data of a production system is replaced with dummy data that appears real to the malware, including matching structure, naming, file types, or metadata of the original production data in each of the recovered system, wherein each recovered system emulates normal production system behavior, including simulating user interactions, scheduled processes, and authentication activity, to deceive the malware while the malware operates;

placing a return malware in a production system responsive to the learned operational characteristics of the multiple malware, including determining, while the malware operates on its corresponding recovered system containing the dummy data, whether the malware attempts to access, modify, or transmit the dummy data, and tailoring placement of the return malware based on an observed behavior of the malware, the return malware being configured such that, in an event of an attack by malware on the production system, the malware will identify the return malware as ordinary data of the production system and transmit the return malware to a malware host system; and executing the return malware at the malware host system, wherein the return malware, upon execution on the malware host system, covertly communicates a beacon or forensic telemetry back to a designated receiver and searches for and exfiltrates cryptographic keys or other confidential data.

17. The method of claim 16, wherein the return malware is transmitted to the malware host system by the malware prior to detecting the malware at the production system.

18. The method of claim 16, further comprising altering the return malware and/or a manner in which the return malware is placed as additional operational characteristics become available.

19. The method of claim 16, further comprising detecting the malware and generating a snapshot of the malware, wherein the snapshot is recovered and run to learn the operational characteristics of the malware.

* * * * *